US012570562B2

(12) United States Patent
Burdette et al.

(10) Patent No.: US 12,570,562 B2
(45) Date of Patent: Mar. 10, 2026

(54) APPARATUS AND METHODS FOR SEQUENTIAL PRESSING TO FORM GLASS-BASED ARTICLES

(71) Applicant: CORNING INCORPORATED, Corning, NY (US)

(72) Inventors: Steven Roy Burdette, Big Flats, NY (US); Patrick Michael Thornton, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 196 days.

(21) Appl. No.: 18/279,893

(22) PCT Filed: Mar. 3, 2022

(86) PCT No.: PCT/US2022/018702
§ 371 (c)(1),
(2) Date: Sep. 1, 2023

(87) PCT Pub. No.: WO2022/187483
PCT Pub. Date: Sep. 9, 2022

(65) Prior Publication Data
US 2024/0067554 A1 Feb. 29, 2024

Related U.S. Application Data

(60) Provisional application No. 63/156,978, filed on Mar. 5, 2021.

(51) Int. Cl.
C03B 11/08 (2006.01)
(52) U.S. Cl.
CPC ........ C03B 11/082 (2013.01); C03B 2215/41 (2013.01); C03B 2215/50 (2013.01)

(58) Field of Classification Search
CPC ...................................................... C03B 11/08
See application file for complete search history.

(56) References Cited

U.S. PATENT DOCUMENTS

| | | | |
|---|---|---|---|
| 2013/0200538 A1* | 8/2013 | Erward .............. | B29D 11/0073 |
| | | | 264/2.7 |
| 2014/0283553 A1* | 9/2014 | Tomisaka .............. | B24B 13/015 |
| | | | 65/61 |
| 2020/0039859 A1 | 2/2020 | Yuan et al. | |

FOREIGN PATENT DOCUMENTS

| | | |
|---|---|---|
| CN | 109626816 A | 4/2019 |
| EP | 1153893 A2 | 11/2001 |

(Continued)

OTHER PUBLICATIONS

International Search Report and Written Opinion of the International Searching Authority; PCT/US2022/018702; mailed on Jun. 23, 2022, 11 pages; European Patent Office.

*Primary Examiner* — Erin Snelting
*Assistant Examiner* — Steven S Lee
(74) *Attorney, Agent, or Firm* — Kevin M. Able

(57) ABSTRACT

A method of forming a glass-based article comprises depositing molten glass onto a first molding member and pressing the molten glass between the first and second molding members by moving the first molding member and the second molding member towards one another. The pressing of the molten glass comprises moving a portion of one of the first and second molding members relative to a remaining portion thereof to form a first reduced-area pressing zone and, after formation of the first reduced-area pressing zone, moving the portion relative to the remaining portion to form a second reduced-area pressing zone where the molten glass is compressed between the first and second molding members.

12 Claims, 5 Drawing Sheets

(56)         References Cited

FOREIGN PATENT DOCUMENTS

| | | | | | |
|---|---|---|---|---|---|
| FR | 3001451 A1 | * | 8/2014 | ............. | C03B 19/04 |
| JP | H10167738 A | * | 6/1998 | ............. | C03B 11/08 |
| JP | 2006315944 A | * | 11/2006 | ............. | C03B 11/08 |
| JP | 2011153051 A | * | 8/2011 | | |
| JP | 2011256051 A | * | 12/2011 | ........... | C03B 11/088 |
| JP | 2017071534 A | * | 4/2017 | | |
| WO | WO-2013191096 A1 | * | 12/2013 | ............. | C03B 11/08 |

* cited by examiner

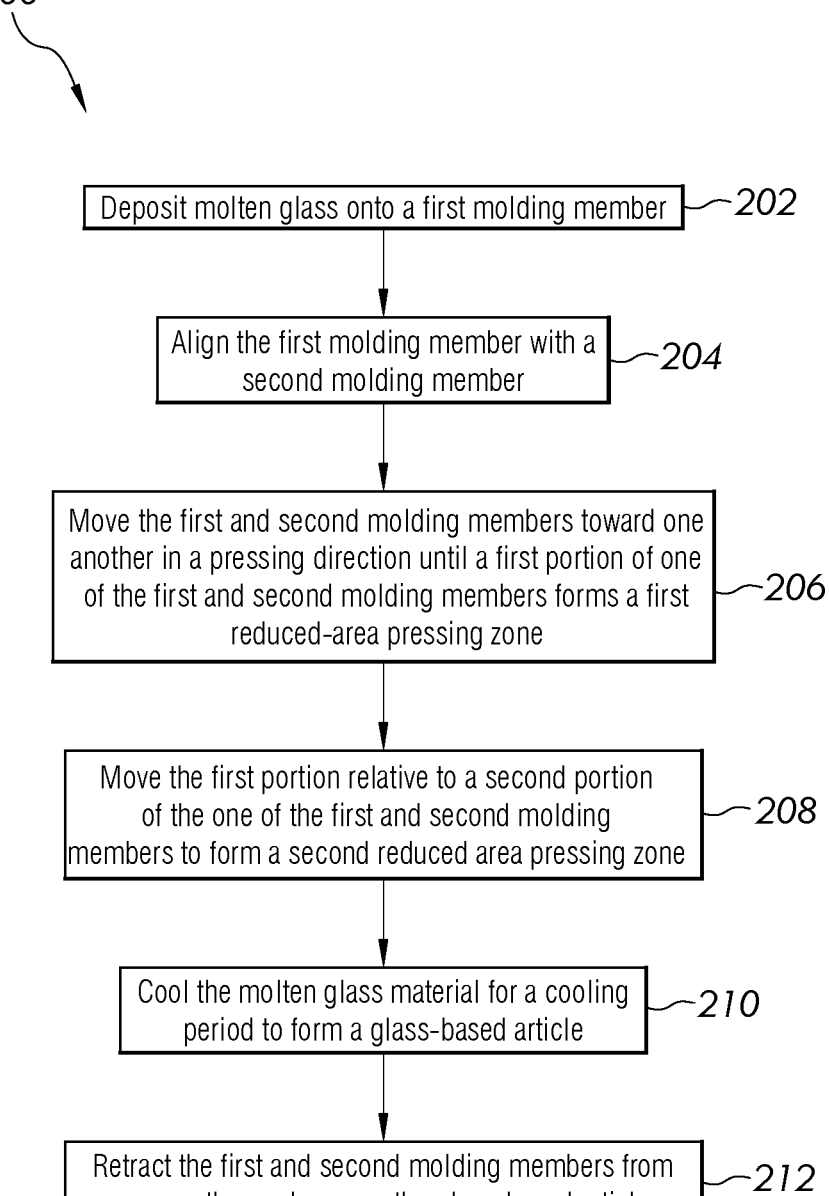

*200*

Deposit molten glass onto a first molding member —*202*

Align the first molding member with a
second molding member —*204*

Move the first and second molding members toward one
another in a pressing direction until a first portion of one
of the first and second molding members forms a first
reduced-area pressing zone —*206*

Move the first portion relative to a second portion
of the one of the first and second molding
members to form a second reduced area pressing zone —*208*

Cool the molten glass material for a cooling
period to form a glass-based article —*210*

Retract the first and second molding members from
one another and remove the glass-based article —*212*

FIG. 2

APPARATUS AND METHODS FOR SEQUENTIAL PRESSING TO FORM GLASS-BASED ARTICLES

CROSS-REFERENCE TO RELATED APPLICATIONS

This application is a national stage entry under 35 U.S.C. § 371 of International Application No. PCT/US2022/018702, filed on Mar. 3, 2022, which claims the benefit of priority under 35 U.S.C. § of 119 of U.S. Provisional Application No. 63/156,978, filed Mar. 5, 2021, the content of each of which is incorporated herein by reference in its entirety.

FIELD

The present specification generally relates to apparatuses and methods for forming glass-based articles.

TECHNICAL BACKGROUND

Thin glass-based articles have a variety of applications in consumer electronic devices. Certain applications may require that the glass-based articles be formed with complex shapes, such as thickness variations, curved peripheries, and/or through-features. Such complex geometries render certain existing fabrication processes unsuitable. For example, reforming processes, where pre-formed sheets are reshaped by pressing the sheets into molds, may not be capable of producing glass-based articles having thickness variations required for certain applications. Accordingly, the production of glass-based articles having desired shapes for certain applications may typically involve a press forming process in which molten glass is placed on a mold having a desired surface shape, and subsequently pressed to form the glass-based articles.

Existing press forming techniques are limited in terms of the thicknesses of the glass-based articles that they produce. The required force in a pressing process to produce a particular glass-based article is highly dependent on both the volume and thickness of the glass-based article. As molten glass is pressed, the glass must flow from the mold center outwards to form the periphery of the glass-based article. As the desired thickness of the glass-based article decreases, the channel size for this flow reduces, increasing the flow resistance and therefore significantly increasing the required pressing force to introduce such flow. Existing pressing apparatuses are simply incapable of producing certain geometries given these force constraints.

SUMMARY

A first aspect of the present disclosure includes a method of forming a glass-based article, the method comprising: depositing molten glass onto a first pressing surface of a first molding member; placing the first molding member in alignment with a second molding member, the second molding member comprising a second pressing surface facing the first pressing surface; and pressing the molten glass between the first pressing surface and the second pressing surface by moving the first molding member and the second molding member towards one another. The pressing of the molten glass comprises: moving a portion of one of the first and second molding members relative to a remaining portion thereof until the portion is separated from the other one of the first and second molding members by a first predetermined minimum separation distance to form a first reduced-area pressing zone where the molten glass is compressed between the first and second pressing surfaces; and after formation of the first reduced-area pressing zone, moving the portion relative to the remaining portion until the remaining portion is separated from the other one of the first and second molding members by a second predetermined minimum separation distance to form a second reduced-area pressing zone where the molten glass is compressed between the first and second pressing surfaces.

A second aspect of the present disclosure includes a method according to the first aspect, wherein the first and second predetermined minimum separation distances equal one another and correspond to a desired thickness of at least a portion of the glass-based article.

A third aspect of the present disclosure includes a method according to any of the first through the second aspects, wherein the desired thickness is less than or equal to 1.2 mm.

A third aspect of the present disclosure includes a method according to any of the first through the third aspects, further comprising retracting first and second molding members from one another after a cooling period such that the molten glass solidifies having a desired shape, wherein the retracting the first and second molding members from each other comprises independently moving the portion or the remaining portion away from the other one of the first and second molding members such that the independently moved portion or remaining portion no longer contacts the molten glass.

A fifth aspect of the present disclosure includes a method according to any of the first through the fourth aspects, wherein the portion of the one of the first and second molding members and the remaining portion share a common central axis.

A sixth aspect of the present disclosure includes a method according to any of the first through the fifth aspects, wherein the portion is centrally disposed within the one of the first and second molding members and the remaining portion circumferentially surrounds the portion.

A seventh aspect of the present disclosure includes a method according to any of the first through the sixth aspects, wherein: the first and second molding members apply a force having a first magnitude on the molten glass within the first reduced-area pressing zone; the first and second molding members apply a force having a second magnitude on the molten glass within the second reduced-area pressing zone; and a difference between the first magnitude and the second magnitude is less than or equal to 15% of the first magnitude.

An eighth aspect of the present disclosure includes a method according to any of the first through the seventh aspects, wherein the first molding member comprises a mold defining a cavity and the second molding member comprises a plunger that is inserted into the cavity to form the first and second reduced-area pressing zones.

A ninth aspect of the present disclosure includes a method according to any of the first through the eighth aspects, wherein the portion comprises a central portion of the mold and the remaining portion comprises a peripheral portion of the mold.

A tenth aspect of the present disclosure includes a method according to any of the first through the ninth aspects, wherein the peripheral portion comprises a curved segment such that a variable separation distance between the first and second molding members is formed in the second reduced-area pressing zone.

An eleventh aspect of the present disclosure includes a method according to any of the first through the tenth aspects, wherein the portion comprises a central portion of the plunger and the remaining portion comprises a peripheral portion of the plunger.

A twelfth aspect of the present disclosure includes a method according to any of the first through the eleventh aspects, wherein the glass-based article comprises at least one thickness variation.

A thirteenth aspect of the present disclosure includes a method according to any of the first through the twelfth aspects, wherein the pressing of the molten glass comprises, after formation of the second reduced-area pressing zone, removing at least one additional portion of the one of the first and second molding members relative to the portion and the remaining portion until the at least one additional portion is separated from the other one of the first and second molding members by a third predetermined minimum separation distance to form a third reduced-area pressing zone where the molten glass is compressed between the first and second pressing surfaces.

A fourteenth aspect of the present disclosure includes a method of forming a glass-based article having at least one thickness variation, the method comprising: depositing molten glass onto a central region of a first pressing surface of a first molding member; moving a second molding member towards the first molding member at a pressing velocity until portions of the first and second pressing surfaces are separated from one another by a predetermined minimum separation distance to form a first reduced-area pressing zone where the molten glass is compressed; and, after formation of the first reduced-area pressing zone moving a central portion of one of the first and second molding members relative to a peripheral portion thereof until remaining portions of the first and second pressing surfaces are separated from one another by the predetermined minimum separation distance to form a second reduced-area pressing zone where the molten glass is compressed.

A fifteenth aspect of the present disclosure includes a method according to the fourteenth aspect, where the moving of the central portion of the one of the first and second molding members relative to the peripheral portion thereof occurs while the second molding member is moving at the pressing velocity.

A sixteenth aspect of the present disclosure includes the method according to any of the fourteenth through the fifteenth aspects, wherein: the predetermined minimum separation distance corresponds to a desired thickness of at least a portion of the glass-based article; and the desired thickness is less than or equal to 1.2 mm.

A seventeenth aspect of the present disclosure includes the method according to any of the fourteenth through the sixteenth aspects, wherein: the first and second molding members apply a force having a first magnitude on the molten glass within the first reduced-area pressing zone; the first and second molding members apply a force having a second magnitude on the molten glass within the second reduced-area pressing zone; and a difference between the first magnitude and the second magnitude is less than or equal to 15% of the first magnitude.

An eighteenth aspect of the present disclosure includes the method according to any of the fourteenth through the seventeenth aspects, wherein the first molding member comprises a mold defining a cavity and the second molding member comprises a plunger that is inserted into the cavity to form the first and second reduced-area pressing zones.

A nineteenth aspect of the present disclosure includes the method according to any of the fourteenth through the eighteenth aspects, wherein the central portion and peripheral portion are components of the mold.

A twentieth aspect of the present disclosure includes the method according to any of the fourteenth through the nineteenth aspects, wherein the central portion comprises a planar surface and the peripheral portion comprises a curved segment.

A twenty first aspect of the present disclosure includes a press forming apparatus for fabricating a glass-based article, the press forming apparatus comprising a first molding member comprising a first pressing surface positioned to receive molten glass; and a second molding member comprising a second pressing surface, wherein the second molding member is movable relative to the first molding member in a pressing direction, wherein at least one of the first molding member and the second molding member comprises a first portion and a second portion, the first portion being movable relative to the second portion in the pressing direction such that, during a pressing sequence, different segments of the first and second pressing surfaces compress the molten glass at different points in time.

A twenty second aspect of the present disclosure includes a press forming apparatus according to the twenty first aspect, wherein the first portion is movable relative to the second portion such that a portion of the first pressing surface is offset from a first segment of the first pressing surface by a first predetermined minimum separation distance to form a first reduced-area pressing zone where the molten glass is compressed.

A twenty third aspect of the present disclosure includes a press forming apparatus according to any of the twenty first through the twenty second aspects, wherein after formation of the first reduced-area pressing zone, the first portion is movable relative to the second portion such that second portions of the first and second pressing surfaces are separated by a second predetermined minimum separation distance to form a second reduced-area pressing zone where the molten glass is compressed.

A twenty fourth aspect of the present disclosure includes a press forming apparatus according to any of the twenty first through the twenty third aspects, wherein the first and second predetermined minimum separation distances equal one another and correspond to a desired thickness of at least a portion of the glass-based article.

A twenty fifth aspect of the present disclosure includes a press forming apparatus according to any of the twenty first through the twenty fourth aspects, wherein the desired thickness is less than or equal to 1.2 mm.

A twenty sixth aspect of the present disclosure includes a press forming apparatus according to any of the twenty first through the twenty fifth aspects, wherein the first molding member comprises a mold defining a cavity and the second molding member comprises a plunger that is inserted into the cavity to form the first and second reduced-area pressing zones.

A twenty seventh aspect of the present disclosure includes a press forming apparatus according to any of the twenty first through the twenty sixth aspects, wherein the first portion comprises a central portion of the mold and the second portion comprises a peripheral portion of the mold.

A twenty eighth aspect of the present disclosure includes a press forming apparatus according to any of the twenty first through the twenty seventh aspects, wherein the peripheral portion comprises a curved segment.

A twenty ninth aspect of the present disclosure includes a press forming apparatus according to any of the twenty first through the twenty eighth aspects, wherein the first portion comprises a central portion of the plunger and the second portion comprises a peripheral portion of the plunger.

Additional features and advantages of the claimed subject matter will be set forth in the detailed description which follows, and in part, will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2 depicts a flow diagram of a method of forming a glass-based article by sequentially compressing molten glass in a plurality reduced-area pressing zones of a press forming apparatus, according to one or more embodiments described herein;

DETAILED DESCRIPTION

Figure 1A:
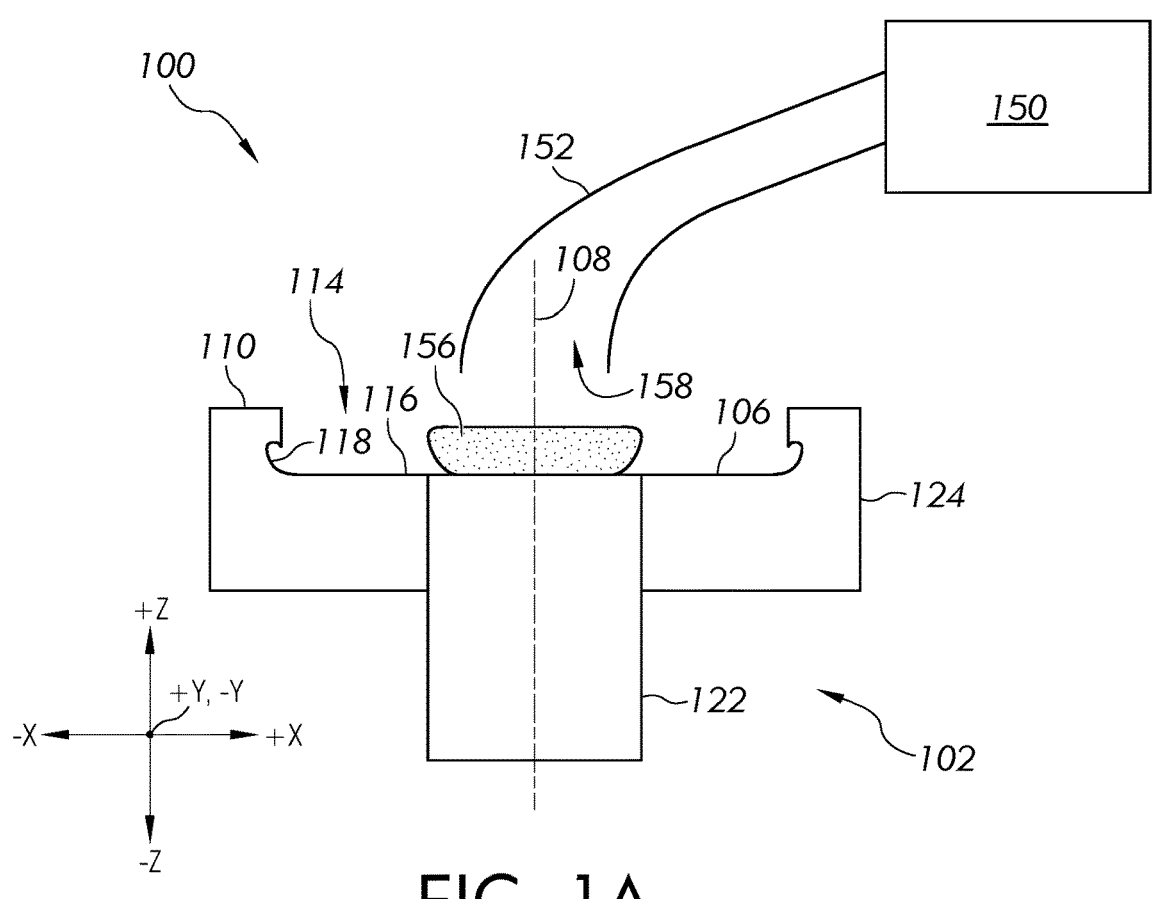
FIG. 1A schematically depicts a first molding member of a press forming apparatus receiving molten glass from a molten glass source, according to one or more embodiments described herein.

Reference will now be made in detail to various embodiments of methods and apparatuses for sequential pressing of molten glass to form glass-based articles. Whenever possible, like reference numerals will be used throughout the drawings to refer to the same or like components. In embodiments, the methods and apparatuses described herein may comprise a pressing sequence involving the sequential formation of a plurality of reduced-area pressing zones between molding members of a press forming apparatus. Molten glass is compressed as each reduced-area pressing zone is formed in order to successively form different regions of a glass-based article. In order to effectuate the formation of such reduced-area pressing zones, at least one of the molding members of the press forming apparatus may comprise a plurality of portions (e.g., at least a portion and a remaining portion), with at least one of the plurality of portions being movable relative to a remainder of the molding member. In embodiments, for example, a first portion of one of the molding members may be moved relative to a second portion thereof such that a portion of a pressing surface is separated from the other molding member by a predetermined minimum separation distance to form a first reduced-area pressing zone. After the formation of the first reduced-area pressing zone, the first portion may be moved in conjunction with the other molding member to form a second reduced-area pressing zone that surrounds the first reduced-area pressing zone in order to compress molten glass flowing outward as a result of the compression within the first reduced-area pressing zone.

By sequentially forming a plurality of reduced-area pressing zones between the molding members, the apparatuses and methods described herein beneficially reduce flow path lengths for the molten glass during compression, thereby lowering the force magnitude required to achieve certain geometries. As molten glass is compressed, the hottest glass flows outward. Given this, within the pressing sequences described herein, the hottest molten glass compressed within the first reduced-area pressing zone may flow outward and be ejected therefrom for subsequent compression within the second (and/or third) reduced-area pressing zone. As a result, the molten glass compressed within the second reduced-area pressing zone may be relatively low in viscosity as compared to molten glass pressed in a similar region with un-segmented molding members. Such viscosity reduction may further reduce the required amount of force to fabricate a glass-based article having a particular thickness.

The concentration of pressing force to reduced-area pressing zones facilitated by the methods and apparatuses described herein facilitates the production of glass-based articles that current press forming techniques are incapable of producing. Existing press forming techniques are incapable of producing glass-based articles having thicknesses of less than or equal to 1.4 mm once the part being produced comprises a cross-sectional area above a threshold (e.g., greater than or equal to 40 cm$^2$, greater than or equal to 50 cm$^2$). The methods and apparatuses described herein, by eliminating such force magnitude constraints, are capable of producing glass-based articles having such thicknesses (e.g., less than or equal to 1.5 mm, less than or equal to 1.2 mm, less than or equal to 1.1 mm, less than or equal to 1.0 mm), with relatively large cross-sectional areas (e.g., greater than or equal to 50 cm², greater than or equal to 60 cm², greater than or equal to 70 cm², greater than or equal to 80 cm², greater than or equal to 90 cm²). By lowering force requirements, the press forming apparatuses described herein may comprise more simple, less expensive pressing equipment, thereby lowering overall fabrication costs.

It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass-based article" are used in their broadest sense to include any object made wholly or partly of glass. Glass-based articles include laminates of glass and non-glass materials, laminates of glass and crystalline materials, and glass-ceramics (including an amorphous phase and a crystalline phase). Unless otherwise specified, all compositions are expressed in terms of mole percent (mol %).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Unless otherwise specified, all temperatures are expressed in terms of degrees Celsius (° C.).

Referring to the drawings in general, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Figure 1B:
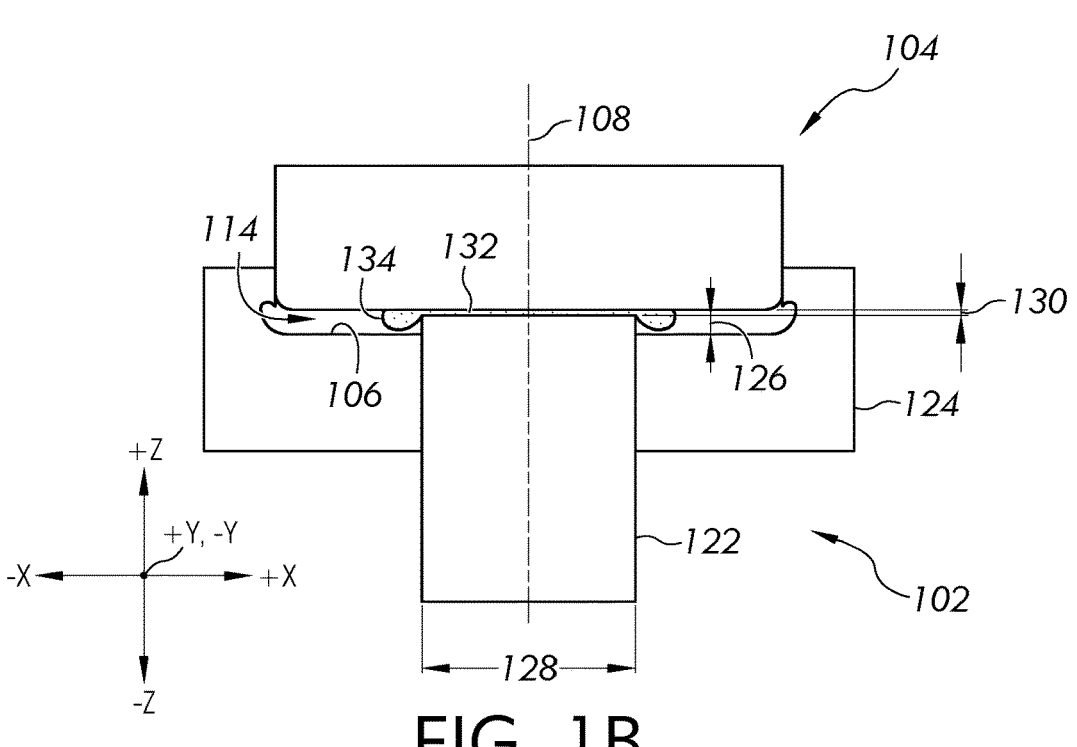
FIG. 1B schematically depicts the first molding member depicted in FIG. 1A and a second molding member of the press forming apparatus pressing molten glass in a first reduced-area pressing zone, according to one or more embodiments described herein.
Figure 1C:
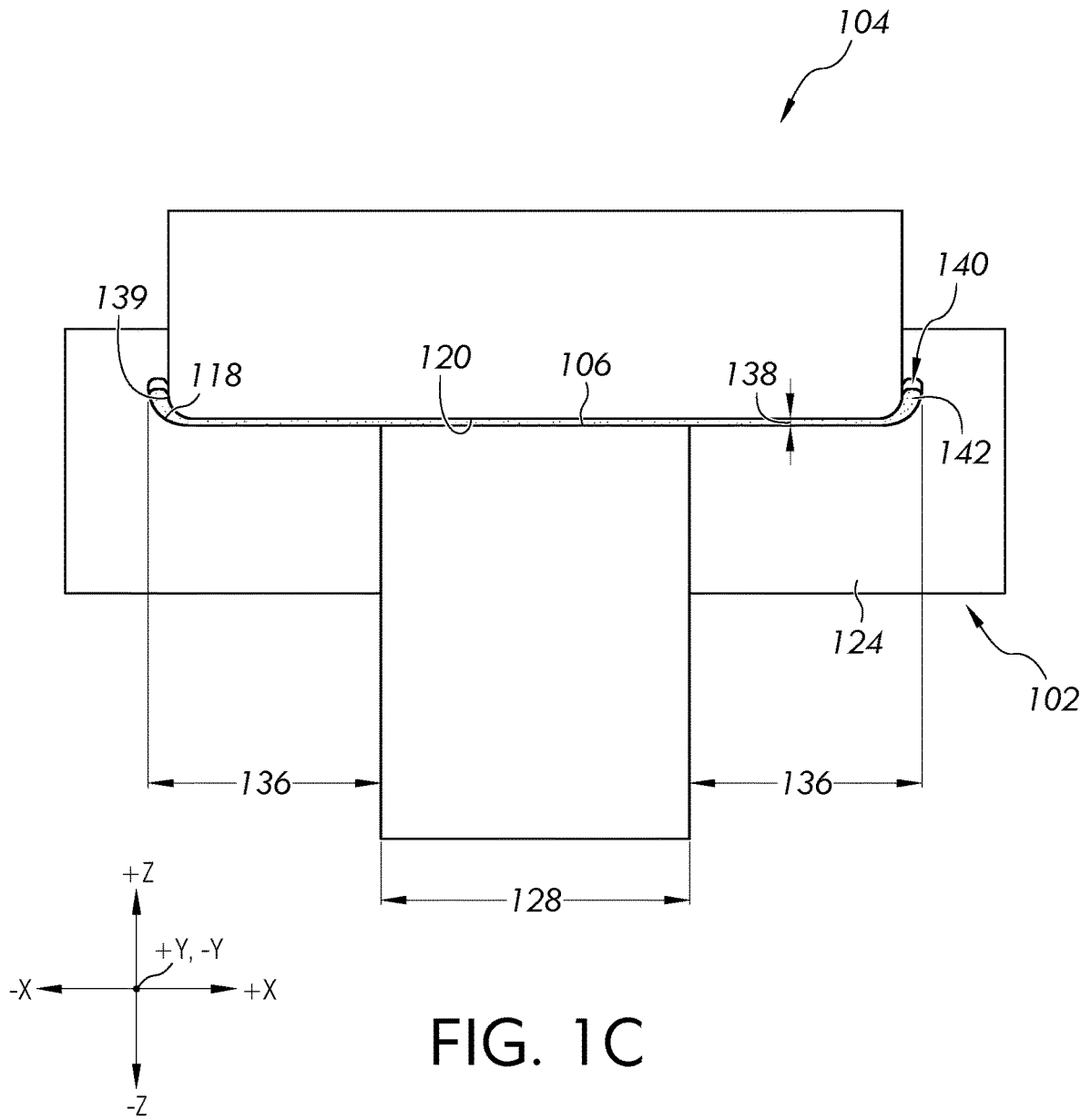
FIG. 1C schematically depicts the first and second molding members depicted in FIG. 1B pressing molten glass in a second reduced-area pressing zone to form a glass-based article having a desired shape, according to one or more embodiments described herein.

FIGS. 1A, 1B, and 1C schematically depict a press forming apparatus 100 according to one or more embodiments of the present disclosure. The press forming apparatus 100 comprises a first molding member 102 and a second molding member 104. FIG. 1A schematically depicts a cross-sectional view of the first molding member 102 of the press forming apparatus 100 receiving molten glass from a molten glass source 150. FIG. 1B schematically depicts a cross-sectional view of the first molding member 102 and the second molding member 104 in an aligned state in order to press molten glass in a first reduced-area pressing zone 128 formed between the first and second molding members 102 and 104. FIG. 1C schematically depicts a cross-sectional view of the first and second molding members 102 and 104 pressing molten glass in a second reduced-area pressing zone 136 formed between the first and second molding members 102 and 104 to form a glass-based article 112 having a desired shape. The press forming apparatus 100 may be implemented in a variety of different contexts depending on the application. For example, in embodiments, the press forming apparatus 100 may be implemented in a glass-based article fabrication apparatus comprises a plurality of stations or assemblies for performing various different steps (e.g., glass formation, treatment, forming, and post-processing) in a process of fabricating a glass-based article. The particular components used in conjunction with the press forming apparatus 100 may vary depending on the particular glass-based article being fabricated.

In embodiments, portions of the press forming apparatus 100 may be movable relative to each other to facilitate conveying glass through various stages of the production process. For example, FIG. 1A depicts a cross-sectional view of the first molding member 102 positioned relative to a glass delivery feed 152 to receive molten glass therefrom. The glass delivery feed 152 is in fluid communication with a molten glass source 150 and conveys molten glass to a first pressing surface 106 of the first molding member 102. In embodiments, the molten glass source 150 comprises a melting vessel receiving batch material and melting the batch material to form a molten glass having a desired composition. In embodiments, the molten glass source 150 comprises various additional components (e.g., a fining vessel, stir chamber, and the like) to remove any defects from the melted batch material prior to delivery to the press forming apparatus 100. It should be understood that the methods and apparatuses described herein are not limited in terms of the compositions of the glass-based articles that they are used to produce. Any suitable composition of molten glass may be used in accordance with the present disclosure.

In embodiments, the glass delivery feed 152 delivers a gob 156 of molten glass to the first pressing surface 106. The glass delivery feed 152 may include a regulating mechanism such that the gob 156 comprises a predetermined volume based on the size of the glass-based article being fabricated. In embodiments, the first molding member 102 may be positioned relative to the glass delivery feed 152 by a conveying apparatus (not depicted) such that the first pressing surface 106 is centered with respect to a delivery opening 158 of the glass delivery feed 152. In the depicted embodiment, the gob 156 may be formed at the center of the first molding member 102 (e.g., such that a center of the resulting gob 156 extends through a central axis 108 of the first molding member 102). In embodiments, the gob 156 may be formed at any location on the first pressing surface 106.

The first molding member 102 may take a variety of forms depending on the particular glass-based article being fabricated. For example, in the embodiment depicted in FIG. 1A, the first molding member 102 is a receiving molding member comprising an upper surface 110 defining a cavity 114 for receiving the second molding member 104. The first pressing surface 106 delineates a boundary of the cavity 114 such that the gob 156 is pressed between the first and second molding members 102 and 104 within the cavity 114 to facilitate containment of the molten glass during the fabrication of glass-based articles. In embodiments, the first molding member 102 does not comprise the cavity 114. In embodiments, the first pressing surface 106 coincides with the upper surface 110 and the first molding member 102 does not include the cavity 114.

The first pressing surface 106 comprises a shape based on a desired surface shape of the glass-based articles being fabricated. In the depicted embodiment, the pressing surface comprises a flat segment 116, and a curved segment 118. The curved segment 118 may be positioned at the periphery of the first pressing surface 106 and delineate a side wall of the cavity 114 so as to form an outer surface of a glass-based article possessing a flat central portion and curved peripheral edges. Such a shape may be useful in consumer electronic device applications (e.g., a casing or the like for various components of a mobile electronic device). In embodiments, the press forming apparatus 100 described herein with respect to FIGS. 1A, 1B, and 1C is configured to fabricate (e.g., based on the shapes of the first and second molding members 102 and 104) glass-based articles having a variable thickness. Glass-based articles produced by the press forming apparatus 100 may include at least one thickness variation where the distance between surfaces of the glass-based articles differs by at least 5% from that in another region of the glass-based article.

After formation of the gob 156 on the first pressing surface 106, the first molding member 102 may be moved (e.g., by a conveying apparatus, manually, or any other suitable method) into a pressing station including the second molding member 104. Referring now to FIG. 1B, the pressing station includes the second molding member 104. In embodiments, the second molding member 104 comprises a plunger that is movable relative to the first molding member 102 in a pressing direction (e.g., the negative Z-direction depicted in FIG. 1B). For example, in embodiments, the pressing station in which the second molding member 104 is disposed may include an actuator or the like configured to move the second molding member 104 in the pressing direction towards the first molding member 102 to compress the gob 156. The second molding member 104 comprises a second pressing surface 120 shaped based on a desired surface shape of the resultant glass-based article. In embodiments, the molten glass in the gob 156 is compressed between the first and second pressing surfaces 106 and 120 such that the molten glass fills the space between the first and second molding members 102 and 104. After such compression, the molten glass may be allowed to cool and solidify to form the glass-based article having a shape based on the configuration of the first and second molding members 102 and 104.

Compression of the gob 156 of molten glass between the first and second pressing surfaces 106 and 120 results in the molten glass traveling outwards (e.g., radially away from the central axis 108 of the first molding member 102) as the first and second molding members 102 and 104 are moved towards one another in the pressing direction. As described herein, as the distance between the first and second molding members 102 and 104 decreases, the flow path for the molten glass to travel radially outward (e.g., towards the curved segment 118 at the periphery of the cavity 114) gets smaller in size, increasing the resistance to flow, thereby substantially increasing the magnitude of force required to induce the radially outward flow of the molten glass. Through analytical methods and computational modeling, it has been determined the required compressive force can be approximated by:

$$\text{Force} = -\frac{v_p * \mu_g * V^3}{T^6}, \tag{1}$$

where $v_p$ is the relative velocity at which the second molding member 104 moves in the pressing direction relative to the first molding member 102, $\mu_g$ is the viscosity of the molten glass being compressed, V is the volume of the glass-based article being fabricated, and T is the thickness of the glass-based article being produced. In view of this relationship, the required compressive force increases dramatically with decreasing thickness of a glass-based article having a given cross-sectional area.

In view of the foregoing, at least one of the first and second molding members 102 and 104 comprises at least first and second portions that are movable relative to one another in the pressing direction to define reduced-area pressing zones within a pressing sequence for forming a glass-based article. For example, in the embodiment depicted in FIGS. 1A, 1B, and 1C, the first molding member 102 comprises a first portion 122 and a second portion 124, and the first portion 122 is movable relative to the second portion 124 in the pressing direction. In embodiments, the first portion 122 comprises a central portion of the first molding member 102 (e.g., the central axis 108 may extend through a center of the first portion 122 in the X-Y plane). In embodiments, the first portion 122 comprises a shape with a cross-section that is symmetrical about at least one axis of symmetry extending through the central axis 108 (e.g., square-shaped, circle-shaped). In embodiments, the first portion 122 comprises a shape that is determined based on a predicted flow of molten glass when the molten glass is compressed between the first and second molding members 102 and 104. Such a shape may take a variety of forms, depending on many factors, including, but not limited to the glass-based article being produced, the composition of the molten glass, and the like. In embodiments, the shape of the first portion 122 is determined based on the shape of the glass-based article being formed (e.g., part mass asymmetry, part thickness asymmetry, and the like). In embodiments, the shape of the first portion 122 is determined based on the composition of the glass, the temperature at which the molten glass is introduced into the press forming apparatus. In embodiments, the second portion 124 circumferentially surrounds the first portion 122 and defines a remainder of the first molding member 102. In embodiments, the first and second portions 122 and 124 are concentrically arranged relative to one another (e.g., the central axis 108 may extend through geometric centers of both the first and second portions 122 and 124 in the X-Y plane). In embodiments, the first molding member 102 comprises more than two portions (e.g., 3 portion, 4 portions, 5 portions, etc.) in such a concentric arrangement.

The movability of the first and second portions 122 and 124 relative to one another facilitates a pressing sequence where different portions of the molten glass is compressed between the first and second molding members 102 and 104 at different points in time in reduced-area pressing zones. For example, as depicted in FIG. 1B, once the pressing sequence begins (e.g., once the first molding member 102 is moved into the pressing station including the second molding member 104), the first molding member 102 may be placed into a configuration in which the first portion 122 is positioned such that there is an offset 126 in the pressing direction at the first pressing surface 106. The portion of the first pressing surface 106 defined by the first portion 122 is more proximate to the second molding member 104 in the pressing direction than the portion of the first pressing surface 106 defined by the second portion 124. In embodiments, the press forming apparatus 100 comprises an actuator or the like (not depicted) for facilitating movement of the first portion 122 relative to the second portion 124.

The offset 126 between the first and second portions 122 and 124 facilitates the formation of a first reduced-area pressing zone 128 between the first portion 122 and the second molding member 104. For example, the second molding member 104 may move towards the first molding member 102 in the pressing direction until the second pressing surface 120 is separated from the first pressing surface 106 by a first predetermined minimum separation distance 130 to form the first reduced-area pressing zone 128. In embodiments, the first predetermined minimum separation distance 130 is determined based on a desired thickness of at least a portion of the glass-based article being produced. In embodiments, the first predetermined minimum separation distance is less than or equal to 1.5 mm (e.g., less than or equal to 1.5 mm, less than or equal to 1.2 mm, less than or equal to 1.1 mm, less than or equal to 1.0 mm).

The first reduced-area pressing zone 128 comprises a lesser cross-sectional area than the glass-based article being fabricated. Such lesser cross-sectional area effectively reduces the V term in equation 1 above, significantly reducing the required compression force required to achieve a given thickness. Compression of the molten glass within the first reduced-area pressing zone 128 generally results in a compressed portion 132 of the molten glass that remains disposed between the first portion 122 and the second molding member 104 (e.g., to form a central portion of the resultant glass-based article) and a flowing portion 134 that flows outward from the first reduced-area pressing zone 128 into the cavity 114 to a region between the second portion 124 and the second molding member 104. The molten glass in the flowing portion 134 may tend to be hotter than the molten glass in the compressed portion 132. Since the molten glass comprises a lower viscosity at higher temperatures, the relatively hot glass in the flowing portion 134 may be more easily compressed than the compressed portion 132, facilitating subsequent compression thereof after formation of the first reduced-area pressing zone 128.

After the molten glass is compressed within the first reduced-area pressing zone 128, the first portion 122 of the first molding member 102 may be moved relative to the second portion 124 so as to remove the offset 126. For example, as depicted in FIG. 1C, once the molten glass is compressed within the first reduced-area pressing zone, the first portion 122 may move in conjunction with the second molding member in the pressing direction so as to eliminate the offset 126 (see FIG. 1B). Once the offset 126 is removed, the first pressing surface 106 may be substantially smooth (e.g., the portions of the first pressing surface 106 included in the first and second portions 122 and 124 may lie in a common plane extending perpendicular to the pressing direction). In embodiments, the first portion 122 and the second molding member 104 are moved at the same rate and by the same amount after being positioned in the manner depicted in FIG. 1B such that the spacing between the first portion 122 and the second molding member 104 is maintained during the movement of the first portion 122. Such movement of the second molding member 104 and first portion 122 may stop once the second portion 124 of the first molding member 102 is separated from the second molding member 104 by a second predetermined minimum separation distance 138 to form a second reduced-area pressing zone 136.

In the depicted embodiment, the second reduced-area pressing zone 136 circumferentially surrounds the first reduced-area pressing zone 128. As such, the flowing portion 134 of the molten glass ejected from the first reduced-area pressing zone 128 is compressed within the second reduced-area pressing zone 136 in order to fill (either partially or completely) the portion of the cavity 114 lying between the second portion 124 and the second molding member 104. In embodiments, the cavity 114 defined in part by the first pressing surface 106 (see FIG. 1A) is shaped such that, once the second reduced-area pressing zone 136 is formed, there is a gap 140 between a sidewall 139 of the second molding member 104 and the curved segment 118 of the first pressing surface 106. Molten glass may enter the gap 140 to facilitate formation of a curved portion of the glass-based article at the peripheral edge thereof. In embodiments, the gap 140 has a thickness that differs from the first and second predetermined minimum separation distances 130 and 138 such that the resultant glass-based article comprises a thickness variation.

In the depicted example, the first portion 122 is moved in the pressing direction in conjunction with the second molding member 104 to eliminate the offset 126. Given this, the second predetermined minimum separation distance 138 equals the first predetermined minimum separation distance 130 such that the resultant glass-based article comprises a portion with uniform thickness that was compressed within both the first and second reduced-area pressing zones 128 and 136. It should be understood that different movement sequences are contemplated and within the scope of the present disclosure. For example, in embodiments, the first portion 122 may be moved from the position depicted in FIG. 1B so as to not completely eliminate the offset 126 such that the second predetermined minimum separation distance 138 is greater than the first predetermined minimum separation distance 130. In embodiments, the first portion 122 may be moved from the position depicted in FIG. 1B by an amount that is greater than the offset 126 so as to form a cavity and molten glass compressed in the second reduced-area pressing zone 136 may flow back between the first portion 122 and the second molding member 104 to form a glass-based article including a central portion with an increased thickness.

In embodiments, the second molding member 104 may move in the pressing direction at a constant velocity during the entirety of the pressing sequence. That is, the velocity of the second molding member 104 may not change as the first portion 122 of the first molding member 102 is moved relative to the second portion 124. In embodiments, the velocity of the second molding member 104 may change during the pressing sequence (e.g., increase or decrease). In embodiments, the velocity of the second molding member 104 may depend on the rate at which the portions of the first molding member 102 are moved relative to one another. If, for example, the first portion 122 is moved at a velocity that is less than an initial velocity of the second molding member 104 (e.g., due to capabilities of an actuator coupled to the first portion 122), the second molding member 104 may slow down to move at the same velocity as the first portion 122. In embodiments, the second molding member 104 may move at an increasing velocity when forming each of the first and second reduced-area pressing zones 128 and 136 to facilitate radially-outward flow of the molten glass. In embodiments, the velocities at which the first and second molding members 102 and 104 are moved may vary depending on a cross-sectional area of a reduced-area pressing zone being formed (e.g., greater velocities may be used to form reduced-area pressing zones having greater cross-sectional areas to facilitate sufficient flow of the molten glass). Embodiments are also envisioned where the second molding member 104 and the first portion 122 of the first molding member 102 move at different velocities in the pressing direction away from the position depicted in FIG. 1B.

While the preceding example described with respect to FIGS. 1A, 1B, and 1C includes a first molding member 102 initially receiving molten glass including multiple portions that are movable relative to one another, it should be understood that the reduced-area pressing zones described herein may also be formed through relative motion of different portions of the second molding member 104. For example, in embodiments, the second molding member 104 may comprise a central portion that is initially protruded (e.g., extends outward in the pressing direction) from a peripheral portion towards the first molding member 102. While in such a configuration, the second molding member 104 may advance towards the first molding member 102 to form the first reduced-area pressing zone 128. The central portion of the second molding member 104 may then be held stationary as the peripheral portion is moved towards the first molding member 102 to form the second reduced-area pressing zone 136. In such embodiments where the second molding member 104 comprises central and peripheral portions that are movable relative to one another, the first molding member 102 may comprise a single-piece construction. Embodiments are also envisioned where both the first molding member 102 and the second molding member 104 comprise a plurality of portions that are movable relative to one another. Any structure and movement sequence involving successive formation of different non-overlapping pressing zones where molten glass is compressed may be used in accordance with the present disclosure.

It should also be appreciated that the shapes of the first and second molding members 102 and 104 are exemplary only. Molding members have a variety of sizes and shapes may be used in accordance with the present disclosure. For example, in embodiments, the first molding member 102 comprises a first pressing surface 106 having a convex shape. In embodiments, the second molding member 104 comprises a second pressing surface 120 having a concave shape. In embodiments, the first molding member 102 and/or the second molding member 104 comprise a plurality of different pressing surfaces. Embodiments are also envisioned where more than two molding members are used. Any different combination of molding members having various shapes and sizes may be used in accordance with the present disclosure.

Referring now to FIG. 2, a flow diagram of a method 200 of press forming a glass-based article including at least one thickness variation is shown. The method 200 may be performed via the press forming apparatus 100 described herein with respect to FIGS. 1A, 1B, and 1C, though press forming apparatuses having other structures may be used. In the following description of the method 200, an example will be described in which the press forming apparatus 100 is used. It should be understood that the steps in the method 200 may vary depending on the particular structure of the press forming apparatus being used.

In a step 202, molten glass is deposited onto a first molding member of a press forming apparatus. For example, in the press forming apparatus 100, the first molding member 102 may be positioned relative to the glass delivery feed 152 to receive molten glass from the molten glass source 150. A gob 156 of molten glass may be formed on the first pressing surface 106 of the first molding member 102. In a step 204, the first molding member on which the molten glass is disposed is aligned with a second molding member. For example, after formation of the gob 156 of molten glass thereon, the first molding member 102 may be moved to a pressing station comprising the second molding member 104.

In a step 206, the first and second molding members are moved towards one another in a pressing direction until a first portion of one of the first and second molding member forms a first reduced-area pressing zone. In embodiments, during or prior to the molding members being moved relative to one another in the pressing direction, one of the first and second molding members may be placed in a configuration for forming the first reduced-area pressing zone. For example, in the press forming apparatus 100, the first portion 122 of the first molding member 102 may be moved to create the offset 126 between portions of the first pressing surface 106. The offset 126 may extend in the pressing direction such that the first portion 122 is disposed more proximate to the second molding member 104 than the second portion 124. Once so configured, the second molding member 104 may advance towards the first molding member 102 in the pressing direction until the second molding member 104 is separated from first portion 122 by the first predetermined minimum separation distance 130. Molten glass disposed on the first portion 122 may be compressed such the first reduced-area pressing zone 128 is formed between the first portion 122 and the second molding member 104. As a result of such compression, flowing portion 134 of the molten glass may be ejected from the first reduced-area pressing zone 128 in a radially outward direction.

In a step 208, the first portion of the one of the first and second molding members that formed the first reduced-area pressing zone is moved relative to a second portion (e.g., the portion that was not involved in the compression of the molten glass in the first reduced area pressing zone) thereof to form a second reduced-area pressing zone. For example, in the press forming apparatus 100, the first portion 122 of the first molding member 102 is moved in the pressing direction in conjunction with (e.g., at the same velocity as) the second molding member 104 until the second portion 124 is separated from the second molding member 104 by the second predetermined minimum separation distance 138. Molten glass that was previously ejected from the first reduced-area pressing zone 128 is thus subsequently compressed between the first and second molding members 102 and 104 in the second reduced-area pressing zone 136. That is, different portions of the molten glass supplied to the press forming apparatus 100 are compressed at different points in time in the first and second reduced-area pressing zones 128 and 136.

In embodiments, the first and second predetermined minimum separation distances 130 and 138 may be selected based on desired thicknesses of different portions of the glass-based article being fabricated. For example, in embodiments, the first and second predetermined minimum separation distances 130 and 138 equal one another to fabricate a glass-based article comprising a region with a uniform thickness, with different portions of the region being compressed in the press forming apparatus 100 at different points in time. A plurality of different mold shape combinations and movement sequences thereof are contemplated and within the scope of the present disclosure in order to fabricate glass-based articles comprising a variety of different shapes.

In embodiments, at least one of the first and second molding members 102 and 104 comprises a plurality of portions that are independently movable relative to one another (e.g., the positioning of each of the portions may be independently adjusted) to facilitate formation of reduced-area pressing zones having a variety of different shapes and sizes. In embodiments, more than two reduced-area pressing zones may be formed between the molding members. In such embodiments, at least one of the first and second molding members 102 and 104 may include at least one additional portion that is movable relative to the remainder thereof (e.g., the first and second portions 122 and 124). For example, in the press forming apparatus 100, the first molding member 102 may include a third portion (not depicted) that circumferentially surrounds the second portion 124, and the second portion 124 may be movable relative to the third portion in a manner similar to that described with respect to the first portion 122 herein such that a third reduced-area pressing zone may be formed after the second reduced-area pressing zone 136. Any number of reduced-area pressing zones may be formed in such a manner to further reduce the required pressing force associated with a particular thickness.

Referring still to FIG. 2, in a step 210, after compression within the first and second reduced-area pressing zones, the molten glass is cooled for a cooling period to allow the molten glass to solidify to form the glass-based article. For example, the press forming apparatus 100 may remain in the position depicted in FIG. 1C for a predetermined cooling period to allow the compressed molten glass to solidify. In embodiments, different portions of at least one of the first and second molding members 102 and 104 may be moved relative to one another during the cooling period to alter the cooling rates of various portions of the molten glass. After compression, for example, molten glass closer to the center of the glass-based article (e.g., compressed within the first reduced-area pressing zone 128) may be at a lower temperature than molten glass at the periphery of the glass-based article (e.g., compressed within the second reduced-area pressing zone 136). Accordingly, the first portion 122 of the first molding member 102 may be retracted from the molten glass (e.g., after a predetermined solidification period) such that the first portion 122 no longer contacts the glass. Lack of contact between the glass and the first portion 122 may reduce the rate at which the glass at the center of the glass-based article is cooled. That is, the periphery of the glass-based article—still in contact with the second portion 124—may cool at a faster rate than the center, diminishing temperature gradients within the solidifying glass material and thereby counteracting residual stress build-up. As such, the portions of the molding members described herein that are movable relative to each other to form the reduced-area pressing zones may also be used to facilitate regulating the temperature of various portions of the solidifying glass during cooling, resulting in glass-based articles containing less residual stress.

In a step 212, the first and second molding members are retracted from one another and the glass-based article is removed from the press forming apparatus. For example, in the press forming apparatus 100, the second molding member 104 may be retracted away from the first molding member 102 in a direction that is opposite to the pressing direction to provide access to the solidified glass-based article. The first molding member 102 may be conveyed to further processing stations (e.g., to perform grinding, polishing, cutting or the like) to provide a glass-based article having desired characteristics (e.g., surface finish). In embodiments, different portions of at least one of the first and second molding members 102 and 104 may be moved relative to one another during the process of removing the glass-based article from the press forming apparatus 100. For example, the first portion 122 may be retracted from the solidified glass-based article in the pressing direction prior to retraction of the second molding member 104 to reduce the contact area between the glass-based article and the first molding member 102. Such a reduced contact area may minimize defects that may arise during the process of separating the glass-based article from the first and second molding members 102 and 104. That is, in embodiments, at least one of the first and second portions 102 and 104 may be independently moved during the process of separating the solidified glass from the press forming apparatus to diminish defects in the resulting glass-based article.

Figure 3A:
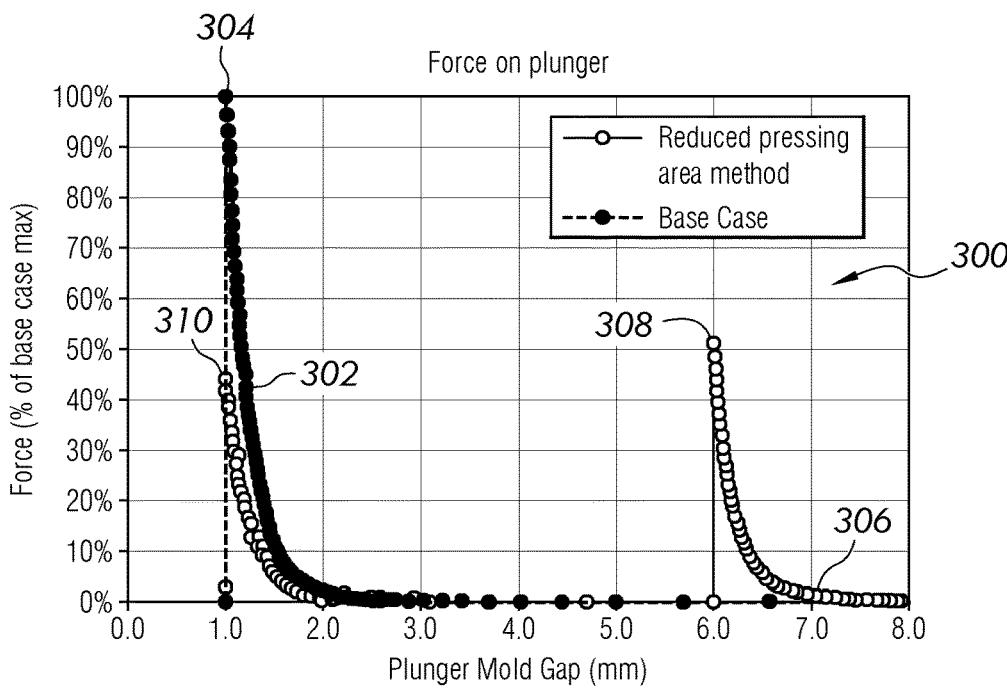
FIG. 3A depicts plot of results of a two-dimensional simulation of force generated during a first pressing sequence and of force generated during a second pressing sequence in which molten glass is successively compressed in a plurality of reduced-area pressing zones, according to one or more embodiments described herein.
Figure 3B:
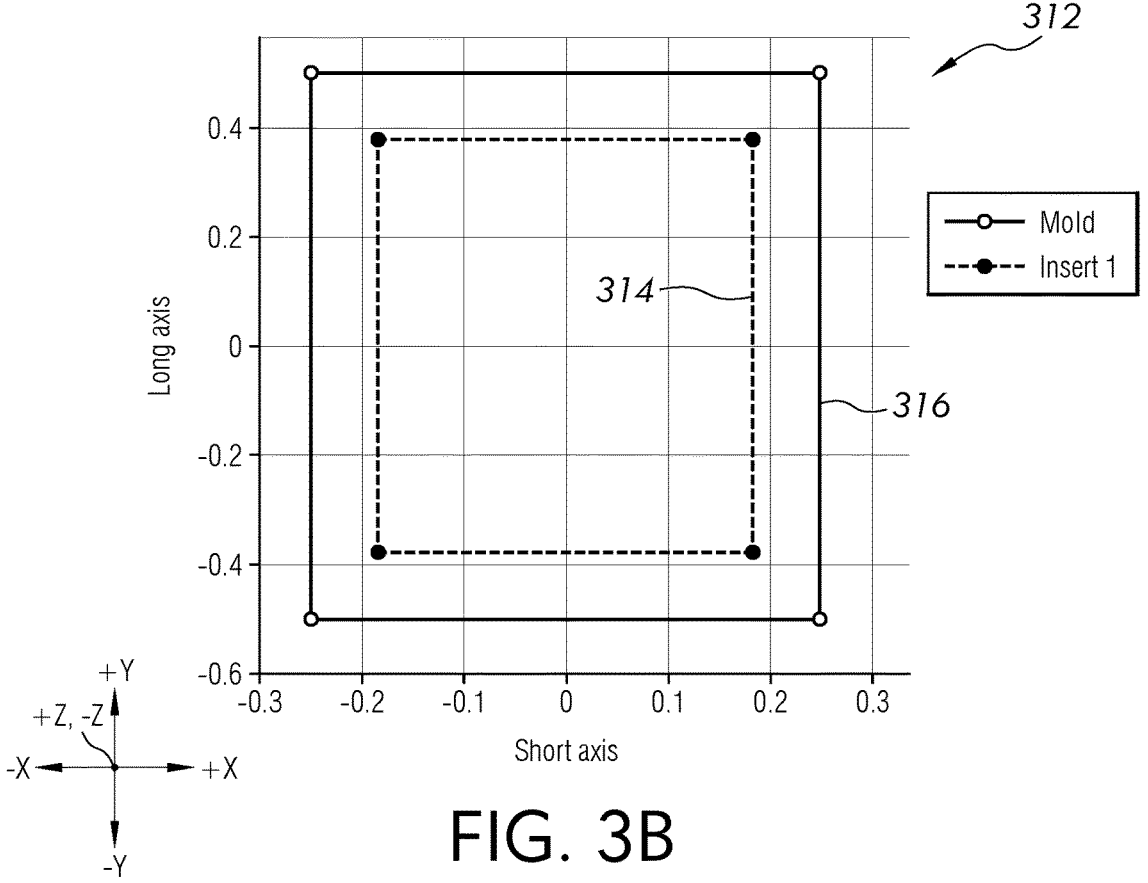
FIG. 3B schematically depicts a plot of dimensions of a molding member of a press forming apparatus used to simulate results of the first and second pressing sequence depicted in FIG. 3A, according to one or more embodiments described herein.

Separating compression of the molten glass into a plurality of different pressing zones in accordance with the present specification beneficially reduces the required compressive force between the molding members to fabricate glass-based articles having a given thickness as compared with existing press molding apparatuses. FIG. 3A depicts a plot 300 of a two-dimensional simulation of two different press sequences for a molding member 312 depicted in FIG. 3B. FIG. 3B schematically depicts a plot of dimensions of the molding member 312. In embodiments, the molding member 312 corresponds in shape to the first molding member 102 of the press forming apparatus 100 described herein with respect to FIGS. 1A, 1B, and 1C. The molding member 312 comprises a central first portion 314 and a peripheral second portion 316. The central first portion 314 is movable relative to the peripheral second portion 316 to facilitate performance of a pressing sequence similar to that contained in the method 200 described herein with respect to FIG. 2. The central first portion 314 and peripheral second portion 316 are depicted to comprise similar cross-sectional shapes (e.g., parallelepiped-shaped comprising a 2:1 aspect ratio) to facilitate computational simulations thereof.

The plot 300 depicted in FIG. 3A depicts a simulated compressive force between molding members as a function of separation distance between the molding members. For example, the molding member 312 depicted FIG. 3B was simulated to undergo two pressing sequences with a second molding member (e.g., a plunger such as the second molding member 104 described herein with respect to FIGS. 1A, 1B, and 1C) to compress molten glass. In the first pressing sequence, the central first portion 314 and peripheral second portion 316 of the molding member 312 were not moved relative to one another. That is, the first pressing sequence corresponded to existing press forming processes where two solid mold members are pressed into one another in a single pressing step. In the second pressing sequence, the central first portion 314 was placed in a position similar to the position of the first portion 122 of the first molding member 102 depicted in FIG. 1B to form a first reduced-area pressing zone, and then re-positioned as described herein with respect to FIG. 1C to form a second-reduced area pressing zone. That is, the second pressing sequence involved sequential pressing of the molten glass in a plurality of reduced-area pressing zones.

In both the first and second pressing sequences used to generate the results depicted in FIG. 3A, the second molding member (not depicted) was simulated to travel towards the molding member 312 at a constant pressing velocity of 40 mm/s to form the pressing zones and compress the molten glass. As depicted in a line 320 in FIG. 3A, in the first pressing sequence, once the molding member 312 and the second molding member reached a predetermined minimum separation distance of 1 mm, a peak compressive force 304 of was generated between the molding member 312 and the second molding member. In the second molding sequence, the central first portion 314 was positioned with an offset (e.g., similar to the offset 126 described herein with respect to FIG. 1B) in the pressing direction of 5 mm, and the second molding member was advanced towards the molding member 312 with the central first portion 314 in such a position to form two reduced-area pressing zones. As depicted in the line 306 of FIG. 3A, once the second molding member reached a relative position of 6 mm to reach a first predetermined minimum separation distance from the molding member 312 of 1 mm, the molten glass was compressed in a first reduced-area pressing zone with a peak force 308 of approximately 53% of the peak compressive force 304 of the first pressing sequence. After formation of the first reduced-area pressing zone, the central first portion 314 was retracted to eliminate the offset by movement in the pressing direction in conjunction with the second molding member until the second molding member was separated from the peripheral second portion 316 by a second predetermined minimum separation distance. As depicted, the molten glass was compressed in the second reduced-area pressing zone with a peak force 310 of approximately of approximately 45% of the peak compressive force 304 of the first pressing sequence. Thus, the sequential pressing of molten glass in reduced-area pressing zones substantially reduced the peak force required to fabricate glass-based articles having a thickness of 1 mm.

As depicted in FIG. 3A, the peak forces 308 and 310 in each of the reduced-area pressing zones are relatively close to one another in magnitude (e.g., the peak force 310 is approximately 85% of the peak force 308). In embodiments, the magnitude of compressive force with which the molten glass is compressed in each reduced-area pressing zone is maintained within 15% of a value of the compressive force in a first reduced-area pressing zone. That is, a difference in the peak forces 308 and 310 may be less than or equal to 15% of the peak force 308. In embodiments, the compressive force reached in each reduced-area pressing zone after a first reduced-area pressing zone (e.g., centrally disposed within the molding members) is within 15% of the compressive force obtained in the first reduced-area pressing zone. Maintaining peak compressive forces within such a variance range beneficially results in the lowest required maximum compressive force to achieve a glass-article having a given thickness. In other words, if the compressive forces achieved in the reduced-area pressing zones vary by more than 15%, the overall force requirements for the press molding apparatus may become prohibitive. In embodiments, the magnitude of compressive force with which the molten glass is compressed in each reduced-area pressing zone is maintained within less than 15% (e.g., less than or equal to 12%, less than or equal to 10%, etc.) of a value of the compressive force in a first reduced-area pressing zone.

The compressive force achieved in each reduced-area pressing zone depends on the cross-sectional shape of each reduced-area pressing zone, which in turn is determined by the geometries of the movable portions of the molding members. The molding members may be designed to maintain the compressive force in the reduced-area pressing zones within the variance ranges described herein. In the simulation described herein with respect to FIGS. 3A and 3B, thermal effects within the molten glass (e.g., heat dissipation through the molding members) were ignored. In such a case, the variable affecting compressive force variation in each of the reduced-area pressing zones to the greatest extent is the cross-sectional area of each movable portion of the molding member 312. Accordingly, the central first portion 314 and peripheral second portion 316 were designed to have equal cross-sectional areas to result in approximately equal peak compressive forces. Other designs, incorporating thermal characteristics of the molten glass and molding members, may have different geometrical configurations to obtain compressive forces meeting the variation constraints described herein. For example, if the molten glass ejected from the first reduced-area pressing zone is hotter and less vicious than the molten glass compressed and remaining in the first reduced-area pressing zone, the second reduced-area pressing zone may be designed to have a greater cross-sectional area than the first reduced-area pressing zone. In embodiments, the reduced-area pressing zones may have differing geometries from one another (e.g., different peripheral shapes) based on the shape of the glass-based article being formed and/or predicted flow characteristics of the glass within the pressing sequence.

While the preceding examples described herein include two reduced-area pressing zones, it should be understood that the pressing sequences of the present disclosure may include any number of reduced area pressing zones (e.g., 3, 4, 5, 6, and so on). A greater number of reduced-area pressing zones beneficially provides greater segmentation of the overall pressing area and therefore reduces the compressive force required to fabricate a glass-based article having a given thickness, at the expense of greater structural complexity.

Figure 4A:
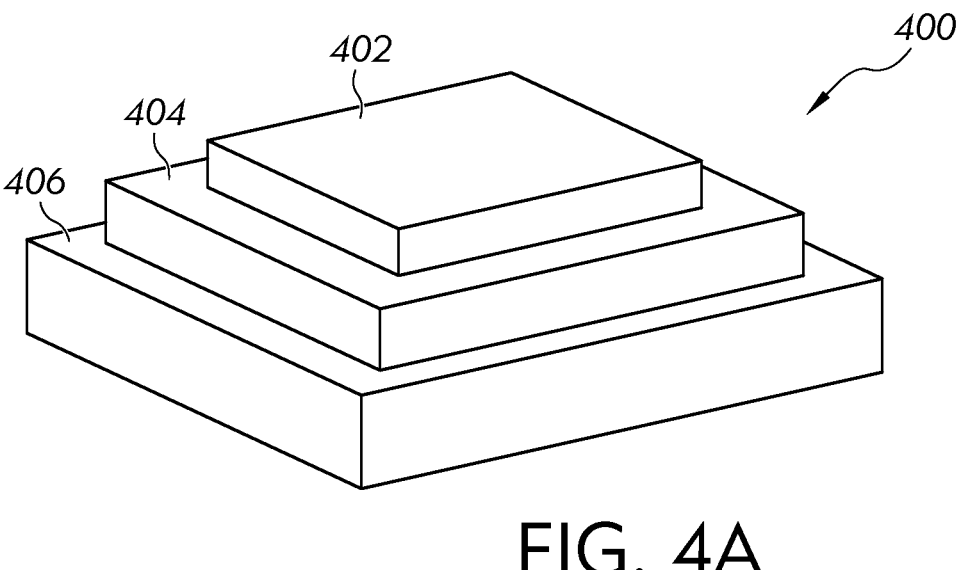
FIG. 4A schematically depicts a molding member of a press forming apparatus comprising a first portion, a second portion, and a third portion to form three reduced-area pressing zones in a pressing sequence, according to one or more embodiments described herein.
Figure 4B:
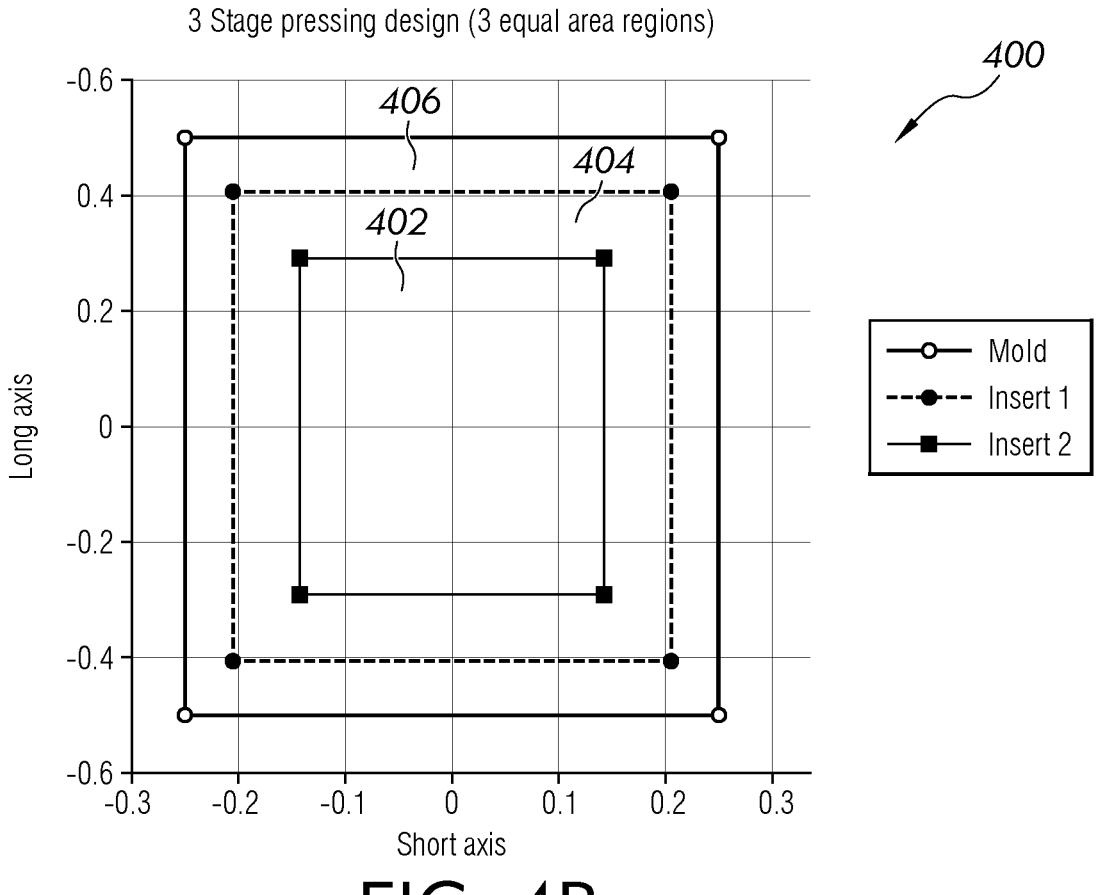
FIG. 4B schematically depicts a plot of dimensions of the portions of the molding member depicted in FIG. 4A, according to one or more embodiments described herein.

FIGS. 4A and 4B schematically depict an example molding member 400 comprising a first portion 402, a second portion 404, and a third portion 406. FIG. 4A depicts a perspective view of the molding member 400, while FIG. 4B depicts a plan-view of the dimensions of each of the first portion, the second portion 404, and the third portion 406. FIG. 4A depicts a simplified version of the molding member 400 for purposes of discussion. It should be appreciated that the molding member 400 may include various geometrical features that are not depicted in FIG. 4A. For example, in embodiments, the molding member 400 comprises a geometrical shape similar to the first molding member 102 of the press forming apparatus 100 described herein with respect to FIGS. 1A, 1B, and 1C. In embodiments, the third portion 406 comprises a peripheral frame comprising the upper surface 110 and curved segment 118 of the first pressing surface 106. The second portion 404 may be frame-shaped and lie circumferentially inward of the third portion 406 (e.g., and comprise a flat portion of the first pressing surface 106). The third portion 406 may be disposed within an opening of the second portion 404 and define a central region of the first pressing surface 106. In embodiments, at least two of the first, second, and third portions 402, 404, and 406 are independently movable to facilitate formation of three reduced-area pressing zones, in which the first, second, and third portions 402, 404, and 406 are separated from a second molding member by first, second, and third predetermined minimum separation distances.

FIG. 4B depicts cross-sectional dimensions of each of the first, second, and third portions 402, 404, and 406 of the molding member 400. In embodiments, peripheral dimensions of each of the first, second, and third portions 402, 404, and 406 are selected such that compressive forces obtained in the reduced-area pressing zones formed between each of the first, second, and third portions 402, 404, and 406 and a second molding member (not depicted) are within the variation constraints described herein. In the depicted example, the first, second, and third portions 402, 404, 406 may comprise equal cross-sectional areas. Such an embodiment may result in equalized compressive force in the event that each reduced-area pressing zone is formed with a similar predetermined minimum separation distance (e.g., as in the example described with respect to FIGS. 3A and 3B) if thermal effects are ignored. Various aspects of the design depicted in FIGS. 4A and 4B may be modified to account for thermal effects (e.g., on viscosity of the molten glass and the like) to facilitate performance of a pressing sequence where molten glass is compressed in a plurality of different reduced-area pressing zones, with a peak compressive force in each of the reduced-area pressing zones having a consistent magnitude (e.g., each peak compressive force may be within 15% of a magnitude of a compressive force in a first compressive force formed between the first portion 402 and the second molding member), thereby lowering the mechanical force requirements on the press forming apparatus.

In view of the foregoing, it should now be understood that glass-based articles may be formed via the formation of a plurality of reduced-area pressing zones where portions of molten glass initially supplied to a molding member are compressed at different points in time. The reduced-area pressing zones beneficially reduce the amount of flow required of the molten glass once a desired minimal thickness for a glass-article is reached, thereby lowering the magnitude of the required force between the molding members to achieve glass-based articles having such a minimum thickness. The methods described herein may facilitate the formation of glass-based articles having relatively low thicknesses (e.g., less than or equal to 1.5 mm) with cross-sectional areas (e.g., at least 0.0625 m$^2$) that are consistent with consumer electronic device applications. Pressing forming of such glass-based articles beneficially permits geometric features (e.g., curves, thickness variations, and the like) to be incorporated into the glass-based articles. Moreover, the reduced force requirements enabled via the methods described herein may also simplify the design of press forming equipment, thereby lowering manufacturing costs of glass-based articles.

It will be apparent to those skilled in the art that various modifications and variations can be made to the embodiments described herein without departing from the spirit and scope of the claimed subject matter. Thus, it is intended that the specification cover the modifications and variations of the various embodiments described herein, provided such modification and variations come within the scope of the appended claims and their equivalents.

What is claimed is:

1. A method of forming a glass-based article, the method comprising:

depositing molten glass onto a first pressing surface of a first molding member;

aligning the first molding member with a second molding member, the second molding member comprising a second pressing surface facing the first pressing surface; and pressing the molten glass between the first pressing surface and the second pressing surface, the pressing comprising:

moving a first portion of the first molding member relative to a second portion thereof until an offset is formed between the first portion and the second portion and the first portion is separated from the second molding member by a first predetermined minimum separation distance to form a first reduced-area pressing zone where the molten glass is compressed between the first and second pressing surfaces;

after forming the first reduced-area pressing zone, moving the first portion relative to the second portion to reduce the offset and moving the second molding member until the second portion is separated from the second molding member by a second predetermined minimum separation distance to form a second reduced-area pressing zone where the molten glass is compressed between the first and second pressing surfaces; and wherein the moving the second molding member comprises varying a velocity of the second molding member based at least in part on a relative velocity between the first and second portions while reducing the offset.

2. The method of claim 1, wherein the first and second predetermined minimum separation distances equal one another and correspond to a desired thickness of at least a portion of the glass-based article, and wherein the desired thickness is less than or equal to 1.2 mm.

3. The method of claim 1, further comprising retracting the first and second molding members from one another after a cooling period such that the molten glass solidifies in a desired shape, the retracting comprising independently moving the first portion or the second portion away from the second molding member such that the independently moved first portion or second portion no longer contacts the solidified glass.

4. The method of claim 1, wherein the first portion and the second portion share a common central axis.

5. The method of claim 4, wherein the first portion is centrally disposed within the first molding member and the second portion circumferentially surrounds the first portion.

6. The method of claim 1, wherein:

the first and second molding members apply a force having a first magnitude on the molten glass within the first reduced-area pressing zone;

the first and second molding members apply a force having a second magnitude on the molten glass within the second reduced-area pressing zone; and a difference between the first magnitude and the second magnitude is less than or equal to 15% of the first magnitude.

7. The method of claim 1, wherein the first molding member comprises a mold defining a cavity and the second molding member comprises a plunger that is inserted into the cavity to form the first and second reduced-area pressing zones.

8. The method of claim 7, wherein the first portion comprises a central portion of the mold and the second portion comprises a peripheral portion of the mold.

9. The method of claim 8, wherein the peripheral portion comprises a curved segment such that a variable separation distance between the first and second molding members is formed in the second reduced-area pressing zone.

10. The method of claim 1, wherein the glass-based article comprises at least one thickness variation.

11. The method of claim 1, wherein the pressing the molten glass comprises, after formation of the second reduced-area pressing zone, removing a third portion of the first molding member relative to the first portion and the second portion until the third portion is separated from the second molding member by a third predetermined minimum separation distance to form a third reduced-area pressing zone where the molten glass is compressed between the first and second pressing surfaces.

12. The method of claim 1, wherein the first portion and the second molding member are moved simultaneously during the forming the first reduced-area pressing zone.

* * * * *